Figure 1:
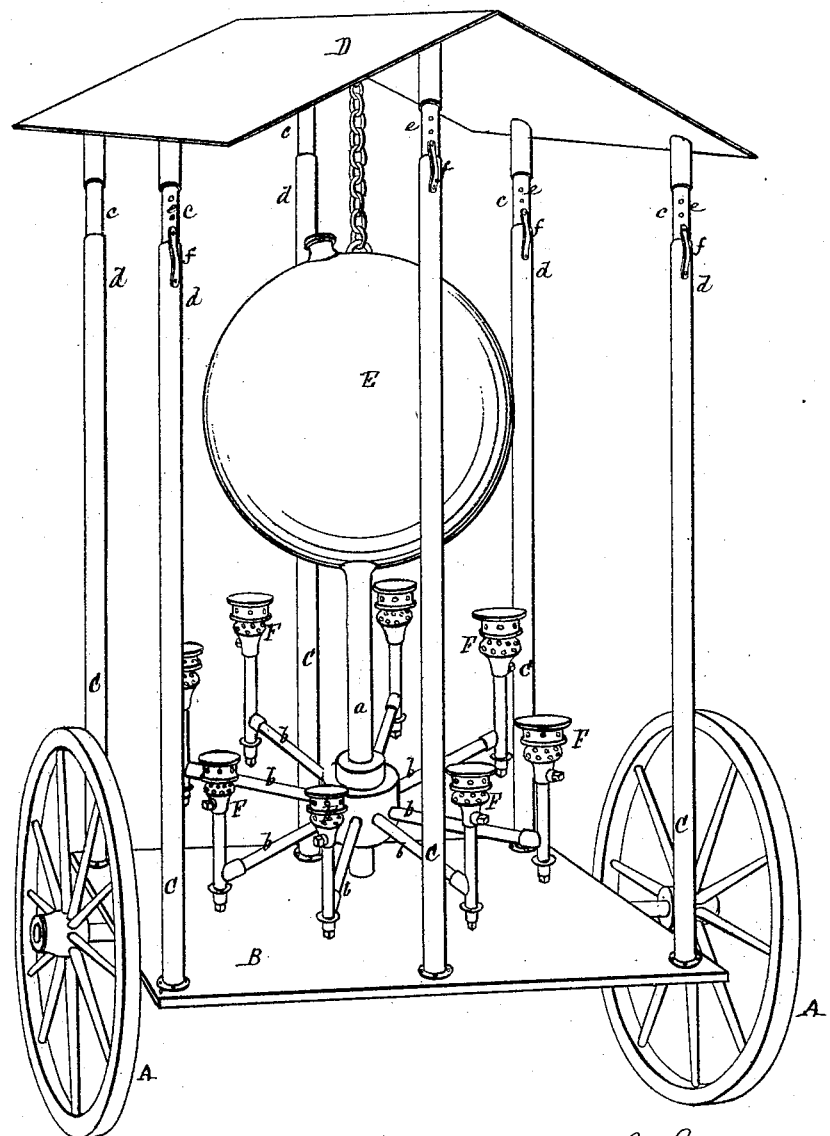

A. Le Blanc,
Insect Destroyer.
No. 101,028.   Patented May 22. 1870.

Witnesses.

Auguste LeBlanc
by his attorney

United States Patent Office.

AUGUSTE LE BLANC, OF LOUISIANA, LA.

Letters Patent No. 101,028, dated March 22, 1870.

IMPROVEMENT IN COTTON-PLANT PROTECTOR.

The Schedule referred to in these Letters Patent and making part of the same.

*To whom it may concern:*

Be it known that I, AUGUSTE LE BLANC, of Louisiana, parish of Orleans and State of Louisiana, have invented a new and improved Cotton-Plant Protector; and I hereby declare the following to be a full, clear, and exact description of the same, reference being had to the accompanying drawing, which represents a perspective view of a machine made in accordance with my invention.

The object of my invention is to protect cotton-plants from the ravages of the cotton-worm.

It has been erroneously supposed by many persons that the cotton-worm is migratory, and travels from one cotton-field to another; but the truth is that it is a caterpillar, which issues from the egg of a moth, deposited upon the tender leaf of a cotton-plant, and that it does not move from the field in which it first made its appearance.

The caterpillars pass quickly through the chrysalis state, and soon become moths or butterflies, to again reproduce their kind. In a short time two or three generations of caterpillars appear and disappear, the number constantly increasing, so that in the course of a few weeks the cotton-field will be completely devastated.

The moths from which the caterpillars are produced do not often make their appearance during the day, but are active at night.

It has occurred to me that instead of attempting the destruction of the worm or caterpillar—which has been found difficult if not impracticable—the better way would be to destroy the moth which deposits the egg from which the worm issues.

In the beginning of the season there are comparatively few moths, and by destroying these, or by keeping them from increasing in number, the cotton can be amply protected.

As above stated, the moth is a nocturnal insect, and it is well known that all such insects are greatly attracted by a light. With this knowledge of their habits I have constructed an apparatus such as will now be described, and which is intended to attract and destroy the moths.

The apparatus is intended to be moved from point to point over the field to be protected, and is, therefore, mounted upon wheels A, so that it may be drawn by a horse or in any other desired manner.

Upon a suitable platform, B, are arranged a number of extensible pillars or posts C, supporting a roof, D, from which is suspended the devices used to obtain the light and flame needed.

These devices consist of the globe or other suitably-shaped reservoir E, which communicates through pipes $a$ and $b$ with a series of radial burners F. These burners are eight in number, but they may be more or less, as desired, and are provided with the usual wicking, or may be constructed in any other suitable manner, to receive and burn the fluid received from the reservoir.

The fluid I prefer to employ is gasoline, for the reason that it is cheap and produces a clear and brilliant flame.

The burners are arranged so as to form a circle of about eight feet in circumference, though, of course, these dimensions may be increased or decreased at pleasure.

The reservoir hangs from the roof of the apparatus, by a chain or rope or equivalent device, so that it may always preserve a proper position, whatever be the position of the carriage.

The pillars or posts are rendered extensible by being formed in two parts $c$, $d$; the one, $c$ fitting and sliding in the other.

A series of holes, $e$, is formed in the part $c$, while a spring stop or pin, $f$, is fixed to the other part.

By this means the burners, roof, &c., may be raised or lowered at pleasure.

It is not absolutely essential that the pillars should be extensible, but I much prefer to make them so, for the reason that the lights may be raised or lowered to conform to the height of the cotton-plants through which the machine passes.

The lights should always be above the tops of the highest cotton-plants.

The roof may serve not only to protect the burners from rain, but also as a means of destroying the moths, for I sometimes coat the underside of the roof with a paint, preferably white paint, made without any "drying" in it, that is to say, made with oil alone, so as to present a sticky surface.

When the machine is in use, the moths, attracted and blinded by the light, will either be destroyed by the flame, or else will come in contact with and adhere to the sticky coating of paint.

The paint, when used, should be removed as often as necessary.

In order to use this machine, the cotton should be planted so as to leave at intervals, say of two acres, a space between the rows wide enough to permit the machine to pass through without injuring the plants.

The mode of using the apparatus will be readily understood. It is to be drawn over such fields as are likely to be infested with the cotton-worm.

It is best to inspect the field from time to time during the first days and nights of June, to ascertain if there be any butterflies or moths. If any are found, the machine should be at once put in operation.

A machine of eight burners will protect from forty-five to fifty acres of cotton, while the cheapness of the fluid employed for burning purposes renders the expense trifling in comparison with the benefits derived.

Having now described my invention and the manner in which the same is or may be carried into effect, I would state that I do not claim, broadly, an insect-destroying apparatus mounted upon wheels; but

What I claim, and desire to secure by Letters Patent, is—

A cotton-plant protector, consisting of the roof D and posts for supporting the same, the fluid-reservoir E and the burners which it supplies, the same being combined and arranged and mounted upon a carriage, substantially as shown and set forth.

In testimony whereof I have signed my name to this specification before two subscribing witnesses.

AUGTE. LE BLANC.

Witnesses:
    AM. DUBUCHT,
    AUG. GURY, Jr.